Figure 13:
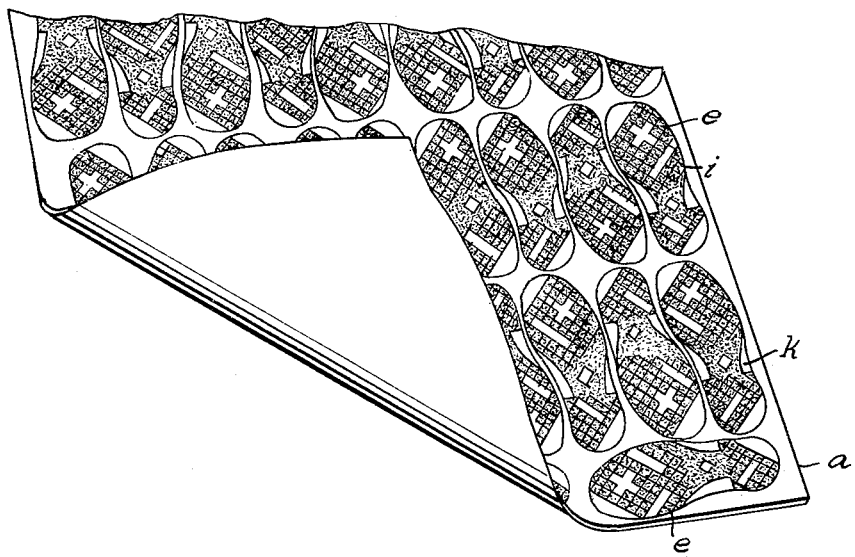

Dec. 3, 1957  R. WASSERMANN  2,815,306
COMPONENTS FOR USE IN PRODUCING FOOTWEAR
AND THE PRODUCTION OF SUCH COMPONENTS
Filed July 27, 1954  3 Sheets-Sheet 1
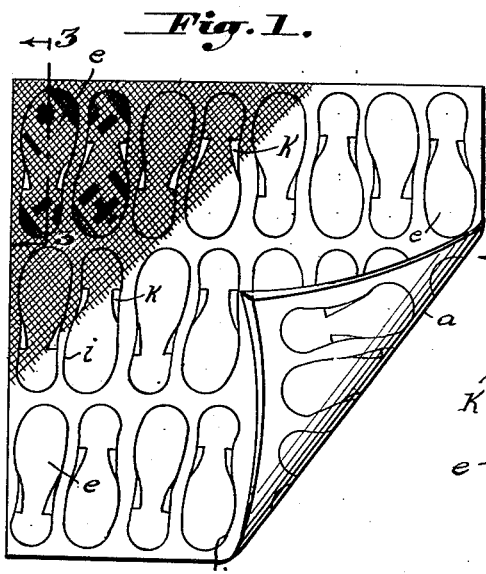
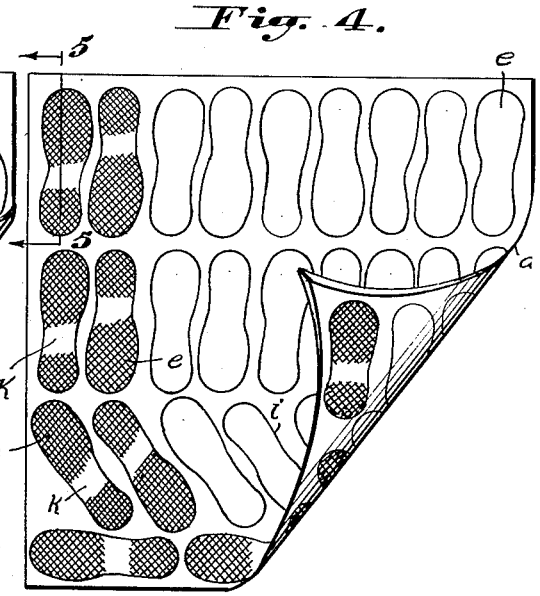
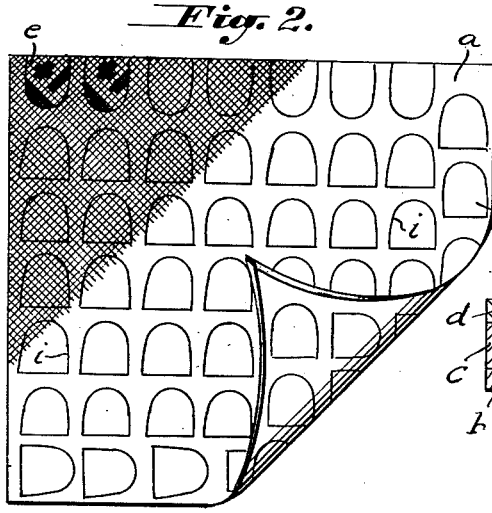
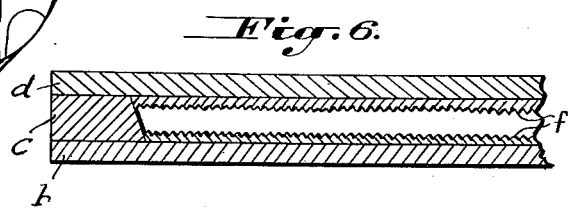
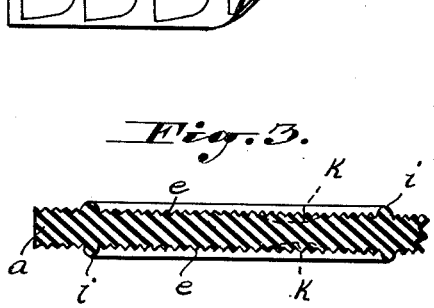
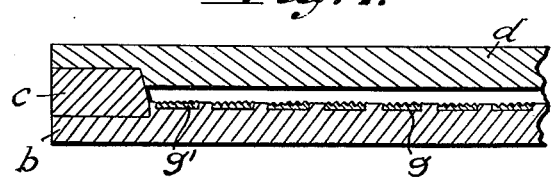
INVENTOR.
Rudolf Wassermann
BY
Attorneys.

Dec. 3, 1957 R. WASSERMANN 2,815,306
COMPONENTS FOR USE IN PRODUCING FOOTWEAR
AND THE PRODUCTION OF SUCH COMPONENTS
Filed July 27, 1954 3 Sheets-Sheet 2
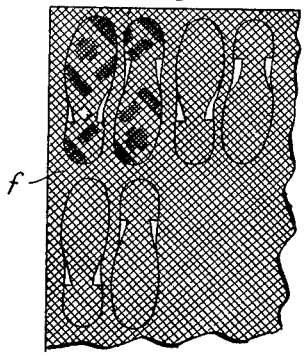
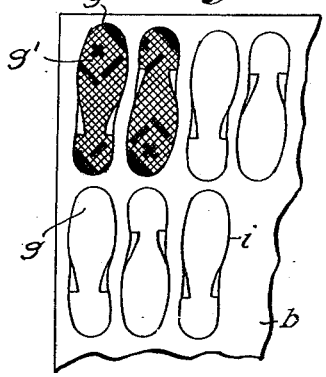
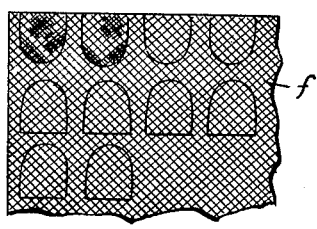
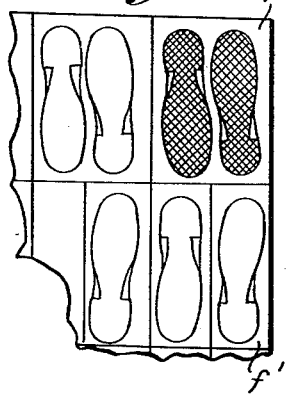
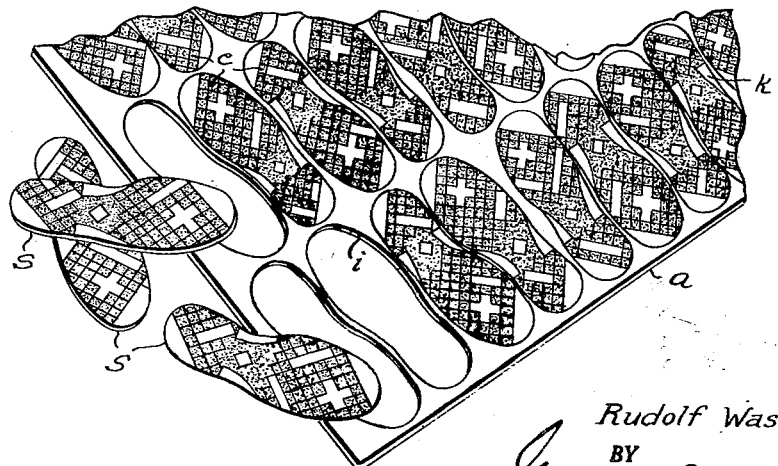
INVENTOR.
Rudolf Wassermann
BY
Attorneys.

Dec. 3, 1957   R. WASSERMANN   2,815,306
COMPONENTS FOR USE IN PRODUCING FOOTWEAR
AND THE PRODUCTION OF SUCH COMPONENTS
Filed July 27, 1954   3 Sheets-Sheet 3

INVENTOR.
Rudolf Wassermann
BY
Attorneys.

United States Patent Office 2,815,306
Patented Dec. 3, 1957

2,815,306

COMPONENTS FOR USE IN PRODUCING FOOTWEAR AND THE PRODUCTION OF SUCH COMPONENTS

Rudolf Wassermann, Wuppertal-Barmen, Germany, assignor to Vorwerk & Sohn, Wuppertal-Barmen, Germany Application July 27, 1954, Serial No. 446,058

Claims priority, application Germany October 29, 1953

21 Claims. (Cl. 154—46)

This invention relates to the art of making rubber or synthetic soled footwear especially such footwear having wearing faces such as soles and heels carrying a tread surface deformed and patterned to provide anti-skid or gripping surfaces.

Such soles and heels, or broadly wearing surfaces, are now conventionally made in individual molds, and are known as molded soles. The production of such soles is tedious, time consuming, expensive, and moreover, requires a new set of molds for even minor change in shoe outline or shoe size.

The problems in making molded soles in the conventional manner become especially difficult where the soles are to be made of porous or cellular rubber or synthetic rubber-like material.

The present invention obviates many of the problems by providing a sheet of material having a plurality of areas deformed and patterned to constitute at least a portion of the desired wearing faces of the footwear. These areas are then punched out to form the finished soles or heels. It will be noted that any of several different outlines of sole can be stamped from any given pattern area.

It is a principal object of the present invention to provide a novel method of manufacturing wearing surfaces for footwear giving the appearance of molded soles.

It is a further object of the present invention to provide a method whereby individual wearing surfaces, such as soles or heels, for footwear are punched out of sheet material and bear on such wearing face, a tread pattern molded in the tread material.

It is still a further object of the present invention to provide a mold whereby a sheet of material may be made having a plurality of areas on one or both sides, each deformed and patterned to constitute a portion at least of the wearing surface of an article of footwear.

And it is a still further object of the present invention to provide an improved mold whereby the above mentioned sheet of material may be readily molded.

The present invention has for a further object the provision of a plate or plates for a mold on which interchangeable engraved pattern forming plates are mounted. These engraved plates being formed in the negative pattern of the tread to be produced.

Figure 14:
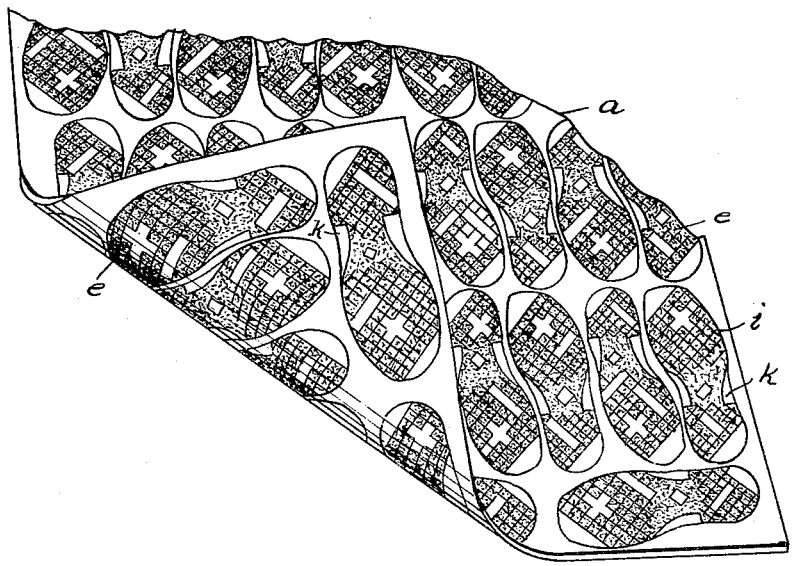

Other and further objects and advantages will appear from the following description taken with the accompanying drawing in which like characters of reference designate corresponding parts in the several views and in which:

Figure 1 is a plan view of a sheet of the material from which the wearing surfaces are to be punched, Figure 2 is a similar view to Figure 1 showing a sheet of material to be used in making heels, Figure 3 is an enlarged section taken on line 3—3 of Figure 1, Figure 4 is a view similar to Figure 1 but showing a sheet of material with a different arrangement of patterned areas, Figure 5 is an enlarged section taken on lines 5—5 of Figure 4, Figure 6 is a fragmentary section of a mold to make a sheet having patterned areas on both sides, Figure 7 is a fragmentary section of a mold for making a sheet having patterned areas on only one face, Figures 8 to 11 are fragmentary plan views of the inner faces of different plates used in the molds of Figures 6 and 7, Figure 12 is a fragmentary view of a sheet illustrating some individual soles punched out therefrom, Figure 13 is a fragmentary view of a sheet similar to that in Figure 4 with a corner folded back to illustrate the patterned areas on one face only, and Figure 14 is a view similar to Figure 13 but illustrating patterned areas on both faces of the sheet.

In the drawings, Figures 1 to 5, $a$ is a sheet of material preferably of porous of cellular rubber, or of synthetic material which is produced in a mold consisting of a base plate $b$, Figures 6 and 7, a spacing frame $c$ which determines the thickness of the sole or heel, and a cover plate $d$. The mold, and therefore the sheet made in the mold, is rectangular or square as seen in Figures 1, 2 and 4.

One or both sides of the sheet $a$ carries a plurality of areas deformed and patterned to constitute a shoe wearing surface such as soles, heels or combination of soles and heels.

Figure 14 shows a sheet with deformed areas $e$ on both sides. Figure 13 shows a sheet with deformed areas $e$ on but one side.

In the simple form of my invention a sheet such as seen in Figure 13 is made in a mold such as seen in Figure 7, that is, having areas constituting the desired wearing surfaces formed on only one side of the sheet. The wearing surfaces $e$ are then punched out of the sheet by any convenient punch press, not shown. Figure 12 shows three shoe soles $s$ punched out of a sheet of material.

It will be noted in Figures 3 and 5 that the entire sole and heel of the shoe carries a "non-skid" pattern which is bounded, in the sheet by a rib $i$ and at the instep there are provided areas $k$ to give the appearance of separate sole and heel. In Figure 12 where several sole and heel combinations have been punched out of a sheet it will be seen that the shape of the punch is not necessarily the exact size and shape of the imprint on the sheet. It is therefore clear that small changes in shoe sole outline and in width and length of the sole and heel combination does not require new molds.

The double faced sheets of Figures 1, 2, 3 and 14 are made in a mold similar to that shown in Figure 6 and these sheets are punched out to make double faced elements similar to the single faced elements of Figure 12. These double faced elements are then split horizontally into two matching, that is right and left, footwear wearing surfaces such as $s$, shown in Figure 12.

While the above description has been given in connection with combination soles and heels, obviously it is equally applicable to soles or heels per se. Figure 2 illustrates the production of heel areas $e'$ only.

The molds of Figures 6 to 11 also constitute a part of my invention. As described above, each mold includes a base plate $b$, a spacer frame $c$, and a cover plate $d$. Mounted on one or on both of the plates, see Figures 6 and 7, according to whether single or double faced sheets are to be made, are profile plates $f$ (Figures 8 or 9), which have been engraved with the patterns of the tread design for the wearing surfaces. The patterns are, of course, arranged in a manner to produce the most efficient use of the sheet and to avoid excessive punching waste. Figures 1 and 4 illustrate different pattern arrangements.

This contour or profile plate *f* is more readily replaceable than would be an entire base or cover plate carrying the patterned areas, and, moreover, the separate contour plates may be made in interfitting smaller units as seen at *f'* in Figure 11 so that, if necessary one portion of the mold can be used to make one type of wearing surface element, and another portion of the same mold can be used to make another type.

Figure 10 shows a fragmentary plan view of the base plate seen in Figure 7. In this form of the mold there are provided depressions or pockets *g* so shaped as to snugly receive plates *g'* which may be replaced at need to change the tread design of the shoe wearing face being produced. In the figure, the tread design is shown on only two plates.

It is to be pointed out that the present invention is particularly concerned with the production of molded wearing surfaces for footwear made of porous or cellular rubber or of a synthetic material susceptible for use as the tread surface of a shoe or for combinations thereof. Principally the invention is to eliminate waste and to decrease the time of production and to provide a method of greater flexibility as compared with prior practices. It is clear from the drawings that this invention provides a method of making stamped-out individual soles or heels or combination sole and heel units having a profiled wearing surface and in which each stamped element presents the appearance of a molded sole or heel. The negative plates impress the tread design in the material during molding of the sheet as formed with either a peripheral groove or a rib whereby the resultant positive pattern on the molded sheet is clearly defined on its periphery by either a raised rib such as *i* in Figure 2 or by a groove.

Further, the basic consideration of having a mold with interchangeable plate elements has provided a method of production in which any given sheet can have the particular wearing surface units arranged thereon in such fashion as to leave minimum space between adjacent pattern areas thus involving minimum waste of material. Further, any given sheet may have arranged thereon sole areas and heel areas as separate areas and/or combination sole and heel areas.

The invention further is characterized in that the mold size that is the pattern plate for making soles and heels is uniform, permitting the expeditious production of various size wearing surface units. The pattern area as molded is of a standard size and the variation in size and the stamped-out sole, heel or combination sole and heel element is effected during stamping. Thus the stamping dies are of different size as compared with prior art arrangements where the individual mold units had to be of different size.

Further by having an individual adaptation of sole or heel patterns it is possible to make different designs of the same size particularly for asymmetrical effects as regards the surface design and the production of special sole joint effects. The stamping-out lines of each individual sole or heel are exactly fixed whereby stamping is facilitated.

The interchangeability of the pattern plates relative to the mold frame facilitates variation of production and assures a most economical utilization of the mold.

As has been previously stated one or both faces of the sheet *a* are provided with the deformed areas corresponding to the design of wearing surface element that is, either heels, soles, combination sole and heels or any other preferred arrangement. Each individual wearing surface element has its contour clearly defined by a rib or groove. The component wearing surface elements are stamped out of the sheet according to the desired size of the stamping die. Where a combination sole and heel has been stamped it is further possible to separate these units to make individual sole and heel units and further if in the molding the patterned areas are provided on both faces of the sheet, the same can be split as a unit and then the individual area stamped out or if desired, the individual areas can be stamped and then individually split.

It is to be further understood that the mold and sheet having the deformed areas thereon can be made of a combination of rubber and synthetic material in laminar form. It may have a porous base and a solid rubber layer for the patterns thereon. The particular tread design is to be made according to the proposed use of the element or to suit taste insofar as appearance is concerned.

It is to be clearly understood that the present invention contemplates not only the method of producing footwear components but also an improved component used in the production of footwear comprising a molded sheet and in which one or both faces of the sheet have a plurality of deformed areas thereon each defining at least a portion of the wearing face of the footwear components with the said plurality of areas being so arranged on the face with relation to their contour as to leave a minimum total area of undeformed sheet surface separating the individually deformed areas from one another.

What is claimed is:

1. As an article of manufacture, a sheet of substantially uniform thickness of a material suitable for use as a wearing surface component of an article of footwear, said sheet having opposite faces and on at least one face a plurality of closely spaced deformed and patterned areas each spaced to define at least a portion of a wearing surface component of an article of footwear.

2. A sheet of material as claimed in claim 1 in which said plurality of areas constitute shoe soles having a tread pattern.

3. A sheet of material as claimed in claim 1 in which said plurality of areas constitute shoe heels having a tread pattern.

4. A sheet of material as claimed in claim 1 in which said plurality of areas constitute combined soles and heels having tread patterns.

5. A sheet of material as claimed in claim 1 in which the material is porous rubber.

6. A sheet of material as claimed in claim 1 in which the material is cellular rubber.

7. A sheet of material as claimed in claim 1 in which the material is synthetic material suitable for use in footwear.

8. A mold for the production of footwear components comprising a flat base plate having an area in excess of the total area of a plurality of said components, a separate spacing frame on the plate and delimiting a molding area, and a cover plate for delimiting and bounding the size and thickness of a sheet of material to be molded therein, at least one of said plates having embodied therewith a plurality of closely spaced, sharply defined areas deformed to impress and pattern a sheet of material in the mold into a sheet having a plurality of surface configurations thereon each constituting at least portions of the wearing faces of footwear components.

9. A mold as defined in claim 8 in which both the cover plate and the base plate are deformed to deform and pattern the surfaces of the material molded therein.

10. A mold comprising a flat base plate having a plurality of closely spaced recesses therein each having a contour corresponding to the contour of at least a portion of the wearing face of an article of footwear and an insert plate in each recess having its contour corresponding to the contour of the recess and having its exposed face deformed to impress a tread pattern into the material being molded.

11. A mold as claimed in claim 8 in which the said plurality of areas are each contoured and deformed to mold a pair of shoe soles in the material.

12. A mold as claimed in claim 8 in which the said plurality of areas are each contoured and deformed to mold a pair of shoe heels in the material.

13. A mold as claimed in claim 8 in which the said plurality of areas are each contoured and deformed to mold a pair of combination sole and heel units.

14. A method of making wearing face components for articles of footwear comprising molding material into a sheet of uniform thickness while impressing into at least one face thereof a plurality of closely spaced pronouncedly contoured and surface patterned areas each defining a wearing face component and thereafter individually punching out said areas to form shaped wearing face components out of the molded sheet.

15. A method of making wearing face components for articles of footwear comprising molding material into a sheet of uniform thickness while deforming both faces of the sheet with complementary deformed and patterned areas in juxtaposition each defining a wearing face component, punching out the wearing face components from the sheet and thereafter splitting the same between the opposite faces to provide a pair of matching wearing face components.

16. A method of making wearing face components for articles of footwear comprising molding material into a sheet of uniform thickness while deforming both faces of the sheet with complementary deformed and patterned areas each defining a wearing face component, splitting the sheet between its faces and thereafter individually punching the wearing face components out of the sheet.

17. A molded sheet of a material suitable for use as a wearing surface of an article of footwear, said sheet being of substantially uniform thickness and having on at least one face thereof a plurality of contoured and deformed areas each defining at least a portion of a wearing surface component of an article of footwear, the said plurality of areas being closely spaced relative to each other and arranged within the margins of the said one face with their contours so related to each other as to leave a minimum total area of undeformed sheet surface separating the individual areas from one another.

18. A molded sheet as claimed in claim 17 in which a raised shaped, marginal rib extends completely around and defines the contour of each area.

19. The method of making tread components for footwear, comprising the steps of molding sheets of moldable material to a thickness twice that of a tread component while forming a plurality of closely spaced patterned areas in juxtaposition on both sides of the sheet of a predetermined size and shape, punching out of each of such juxtaposed patterned areas a dual thickness tread component units of a desired size, and splitting said units apart between their opposite faces to form pairs of tread components.

20. The method of producing shoe soles with profiled tread from a sheet of material of uniform thickness, comprising the steps of forming sole patterns on both surfaces of the sheet of substantially uniform thickness, and stamping pairs of soles from said sheet and within the outlines of said patterns.

21. The method of making tread components for footwear, comprising the steps of forming sheets of tread component material while deforming therein a plurality of closely spaced patterned areas of a predetermined size and shape having a pronounced margin, and punching out similarly shaped tread components from within each such margin of the patterned areas of a size range selected from one smaller than said predetermined size up to a size corresponding to said predetermined size.

References Cited in the file of this patent

UNITED STATES PATENTS

| | | |
|---|---|---|
| 1,471,587 | Bourn | Oct. 23, 1923 |
| 1,817,287 | Bell | Aug. 4, 1931 |
| 1,932,548 | Ingwer | Oct. 31, 1933 |
| 1,989,646 | Tuttle | Jan. 29, 1935 |
| 2,077,508 | Bierer | Apr. 20, 1937 |
| 2,301,662 | Wilson | Nov. 10, 1942 |
| 2,748,425 | Coffey | June 5, 1956 |